Feb. 16, 1932.   T. E. MURRAY, JR   1,845,435
RADIATOR
Filed Oct. 29, 1929   5 Sheets-Sheet 2
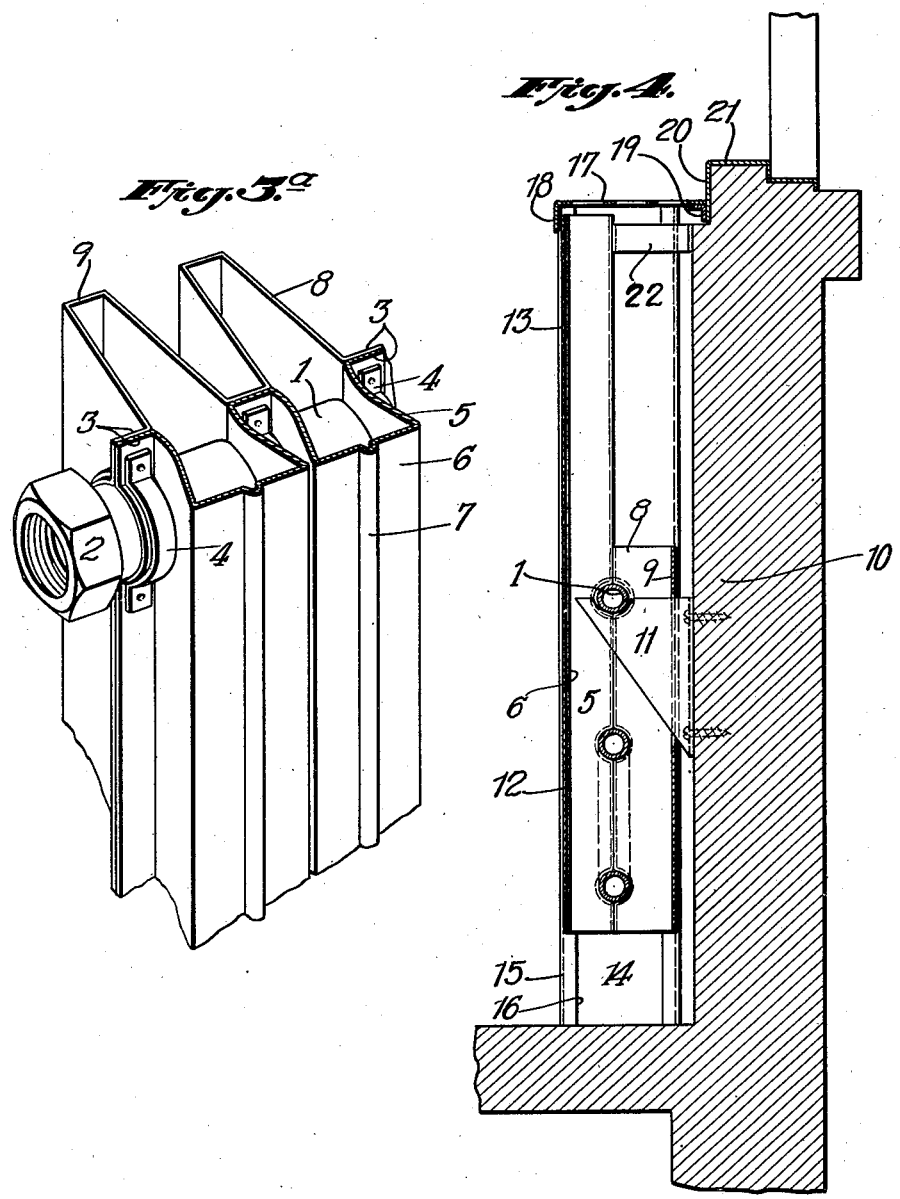
Inventor
THOMAS E. MURRAY JR.
By His Attorneys
Usina & Rauber

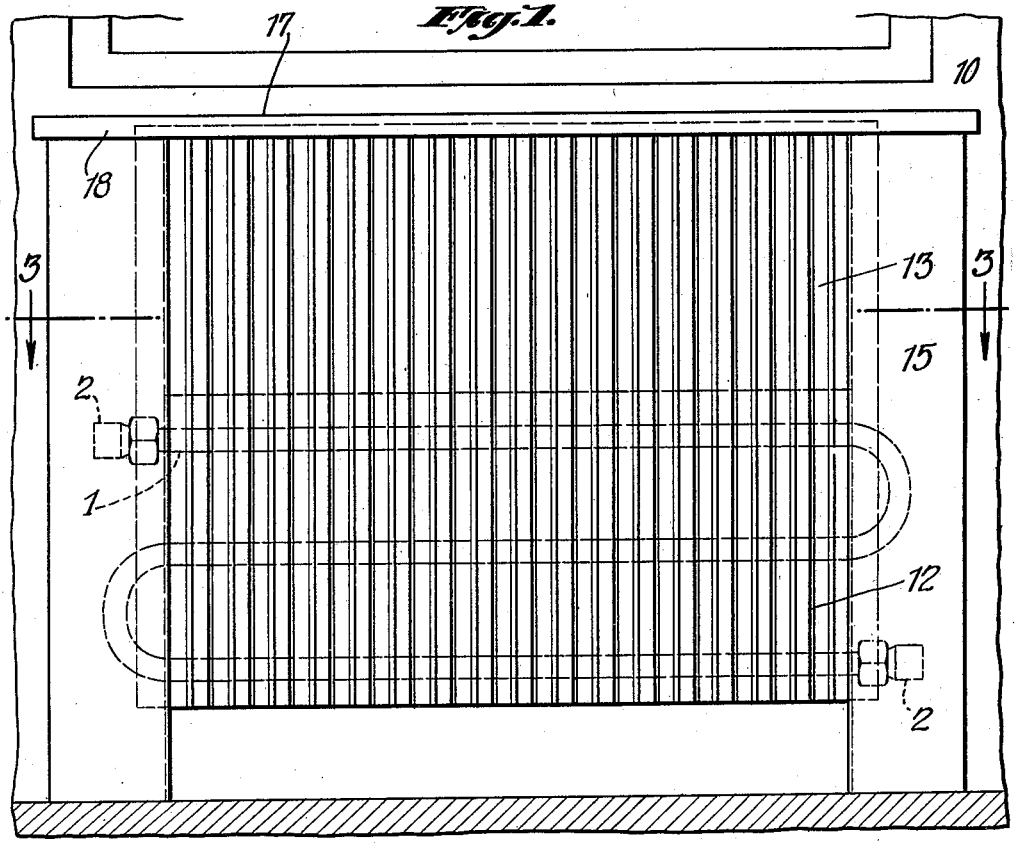
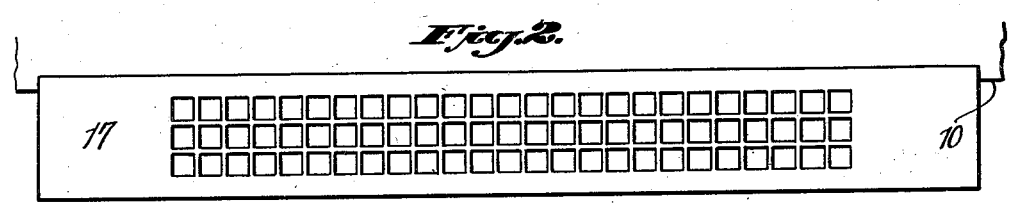
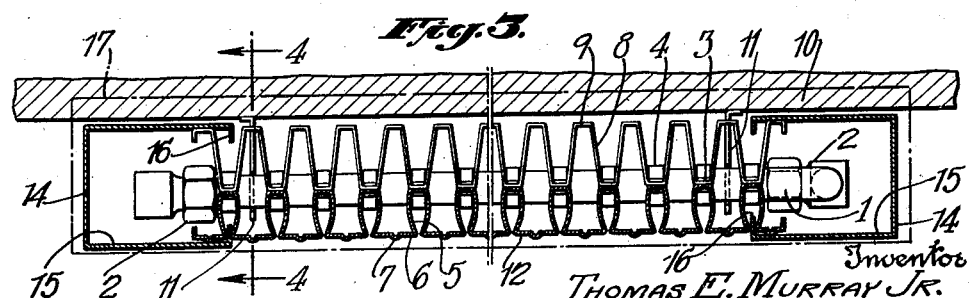

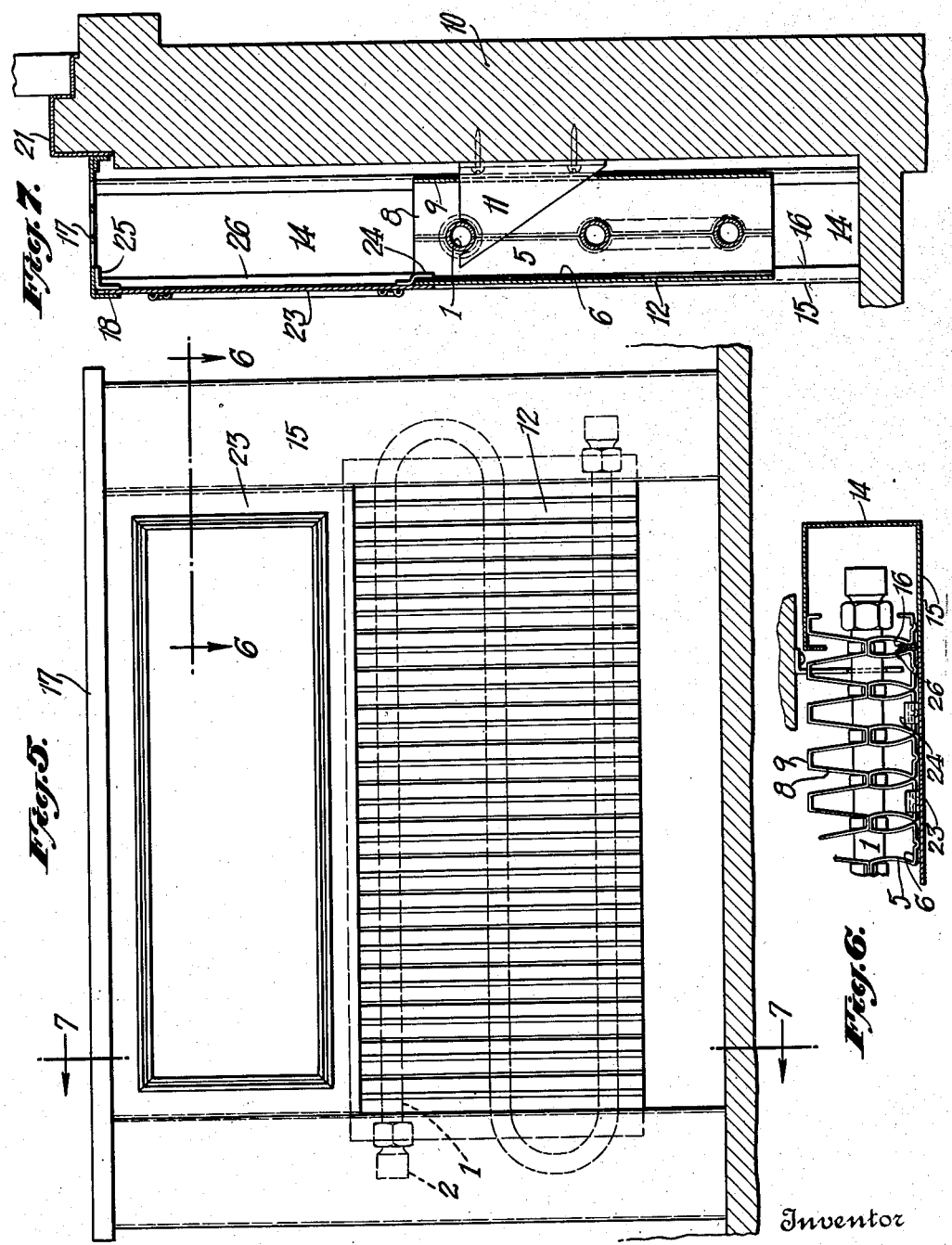

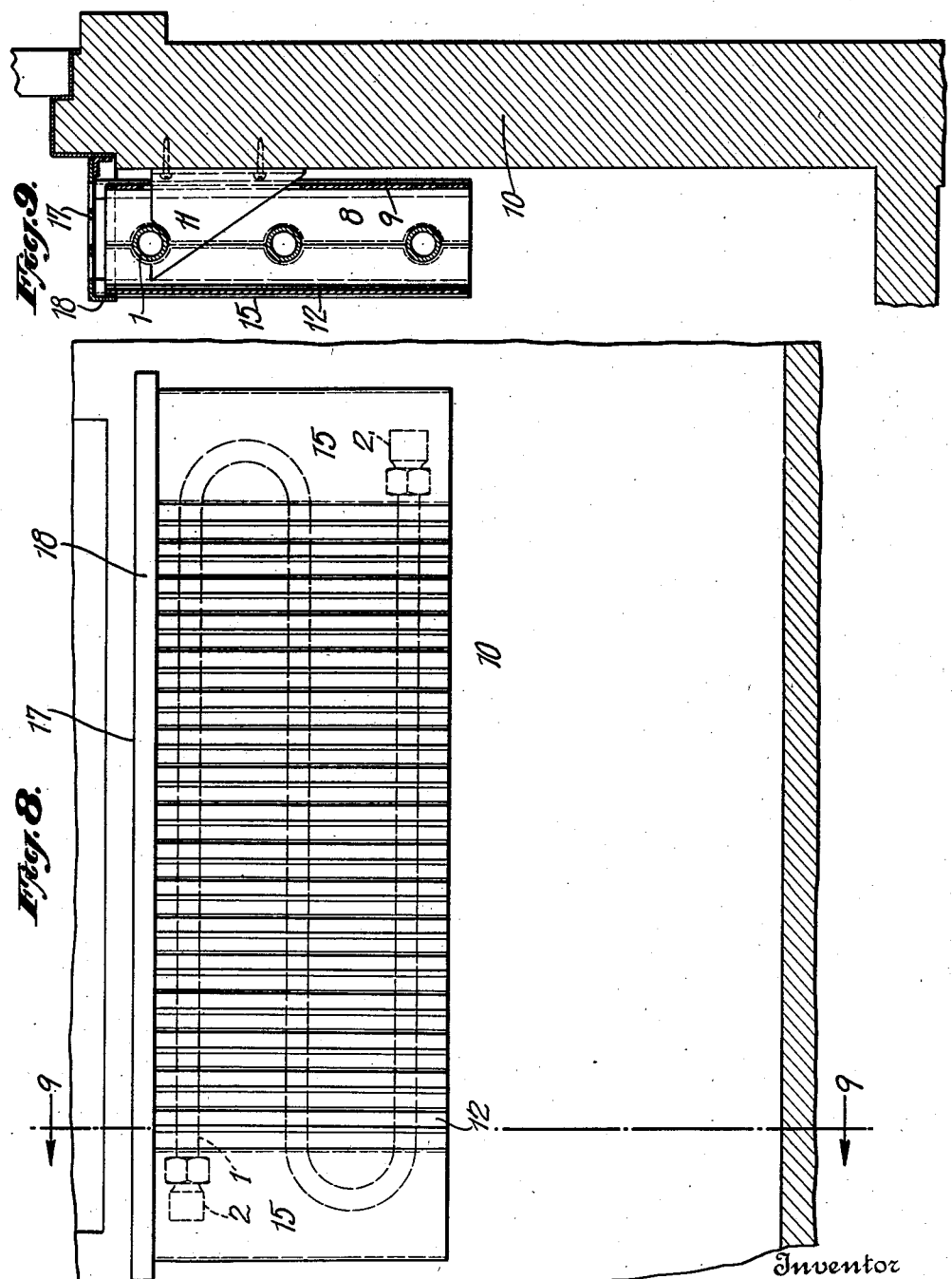

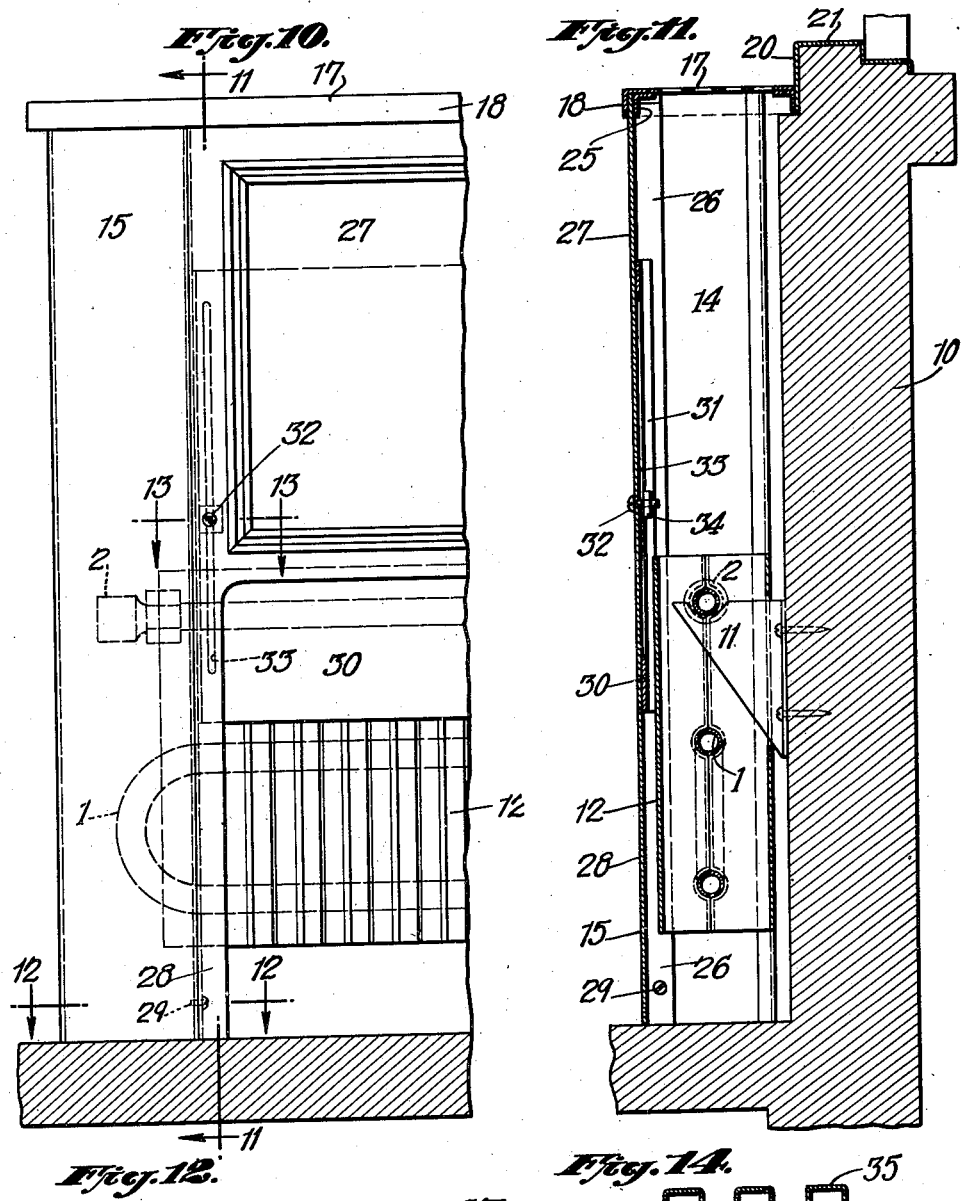

Patented Feb. 16, 1932

1,845,435

UNITED STATES PATENT OFFICE

THOMAS E. MURRAY, JR., OF BROOKLYN, NEW YORK, ASSIGNOR, BY MESNE ASSIGNMENTS, TO AMERICAN RADIATOR & STANDARD SANITARY CORPORATION, OF CORPORATION OF DELAWARE

RADIATOR

Application filed October 29, 1929. Serial No. 403,147.

In a previous application, No. 378,653, filed July 16, 1929, which has now matured into Patent No. 1,816,607, granted July 28, 1931 and other earlier applications, there are described radiators of the general Murray type in which a horizontal tube or other heating element is embraced between thin corrugated sheets, the corrugations at one side having outer faces of greater width and being of less depth than those of the other side.

The present invention is directed to the installation of radiators of this and other types, and is adapted also for air cooling apparatus of the same general character. The invention provides attractive, simple and economical methods of mounting the radiators in a room.

The accompanying drawings illustrate embodiments of the invention.

Fig. 1 is a front elevation of a radiator installed near the wall immediately below a window;

Fig. 2 is a plan view thereof;

Fig. 3 is a horizontal section of the same on the line 3—3, Fig. 1;

Fig. 3ª is an enlarged perspective view of a portion of Fig. 3;

Fig. 4 is a transverse section approximately on the line 4—4 of Fig. 3;

Fig. 5 is a front elevation of a modification;

Fig. 6 is a horizontal section thereof on the line 6—6, Fig. 5;

Fig. 7 is a vertical section on the line 7—7 of Fig. 5;

Fig. 8 is a front elevation of another modification;

Fig. 9 is a vertical enlarged section thereof on the line 9—9 of Fig. 8;

Fig. 10 is a portion of a front elevation of another modification;

Figs. 11, 12 and 13 are sections of the same on the corresponding lines in Fig. 10;

Fig. 14 is a diagram illustrating an alternative extended area structure.

The radiator illustrated has as a heating element a tube 1 extending back and forth, as illustrated in Fig. 1 in dotted lines, with couplings 2 at the ends for connection of admission and discharge pipes which may come up through the floor within the casing, hereinafter described.

Applied to the opposite sides of the tube are sheets of conducting material, preferably thin copper or aluminum corrugated in the manner shown so as to provide an extended area in the form of a series of transverse elements for transmission of heat from the tube to the air, and forming vertical flues which induce a strong draft and cause a heating and rapid circulation of the air upward and thence throughout the room.

The opposite corrugated sheets form longitudinal plates 3 (Fig. 3ª) and the inner edges of the corrugations are recessed to embrace the tube 1 and permit the bringing of the opposite plates 3 together. They are fastened to each other and the corrugated sheets clamped firmly on the tube by means of stiff straps 4 which are welded or riveted together through the intermediate plate 3, all as described more fully in my previous cases.

The outer corrugated sheet forms outwardly diverging fins or plates 5 connected at their outer edges with longitudinal plates 6, preferably having vertical ribs 7 along the centre which stiffen them and improve the general appearance. The plates 6 are so wide as to bring the vertical edges of the adjacent plates close to or substantially in contact with each other and to present a substantially flat face with narrow vertical lines of very ornamental appearance.

The corrugated rear sheet forms transverse plates 8 converging outward to the edges of the connecting longitudinal plate 9. The corrugations of the rear sheet are, therefore, deeper (in the horizontal dimension transverse to the pipe) than the corrugations of the front sheet, but are narrower (in the direction parallel to the length of the pipe) than the corrugations of the front sheet. By this arrangement there is economy of horizontal space in the shape of the front corrugated sheet, while the rear corrugated sheet extends its heating effect to the air at a greater distance from the heating element. I secure the efficiency in this respect of the rear corrugations with the improved appearance and security against accidental injury of the front corrugations.

In mounting the radiator against the wall 10 (Fig. 4) below a window, it may be supported from hangers 11 passing through plates 9 and fastened to the face of the wall and fitting under one of the lengths of the tube 1. Generally it is desirable to carry the bottom of the radiator nearly to the floor. Radiators of this type do not have to be of the height of the common cast iron radiators. For the same heating effect they are generally made of much less height.

But to make a neat appearance in the room, they should extend up to about the level of the window sill. For this purpose, according to Figs. 1 to 4, the outer corrugated sheet, indicated as a whole by the numeral 12, is provided with an extension 13 carrying it continuously up to the desired height. This not only improves the appearance but also gives added height to the flues and an improved effect.

The ends of the radiator are preferably framed in end pieces of sheet metal bent to form channels each with a transverse portion 14 (Fig. 3), longitudinal portions 15 and inwardly bent flanges 16 at the edges of the latter which fit between corrugations near the ends of the radiator proper. These end pieces extend to the floor and rest thereon.

On the upper edges of the end pieces and forming the top of the enclosure or structure is a plate 17 having edge flanges 18 fitting over the extension 13 of the radiator and over the end pieces 14, 15. The top plate 17 is perforated (Fig. 2) to permit free egress of the heated air. The space below the radiator is sufficient to admit the cold air from the zone near the floor of the room.

The top plate 17 rests on an angle 19 which is welded to a flange 20 depending from the window sill 21. Braces are inserted between the upper portion of the extension 13 and the wall; such as spacers 22 (Fig. 4) each having a rear flange fastened to the wall, and a front flange bearing against the extension 13.

The extension 13 of the front plates of the radiator may be effected by means of separate sheets as shown in Figs. 5, 6 and 7. Instead of carrying up the complete outer corrugated sheet 12, a substantially flat sheet 23 is used; it may be paneled as illustrated for ornament and to contribute stiffness, or may be of various other designs.

The sheet 23 is held on the upper edges of plates forming the front sheet 12 by means of clips 24 fastened at intervals, see Fig. 6. The top plate 17 has an angle 25 fastened on its under side near the front to form with the flange 18 a groove which receives the upper edge of the extension 23. The plate 23 may also be fastened at its vertical edges to the flanges 16 of the end frames 14, 15; the plate 23 being provided with flanges 26 bolted or riveted to the flanges 16. See Fig. 6.

As shown in Figs. 8 and 9, the radiator may be hung immediately below the level of the window sill with its bottom correspondingly elevated above the floor. In cases where the supply and discharge pipes are brought up inside of the wall 10, this arrangement increases considerably the available floor space in the room. The hangers 11, of course, are suitably elevated and the top plate 17 is spaced immediately above the radiator. The end frames 15 also terminate with their lower ends level with the lower end of the radiator, being welded or otherwise fastened within the flange 18 of the top plate.

At the back of the radiator the building wall and the end frames provide a space which is substantially closed in cross section and thus insure the vertical draft of all the air coming in contact with the corrugated sheet; so that for the rear sheet the advantage of extending as far as possible horizontally from the heating element is secured and it is not important that the outside flues or passages between the corrugations be closed by compressing the sheet (as at the front).

While the compressed front sheet conveys the heat to a less distance laterally than the rear sheet, it provides an increased radiant heating effect. This radiant effect is the heat radiated directly to a person standing in front of the radiator, as distinguished from the heat circulated throughout the room by the induced draft of air through the radiator.

Where an extra panel is arranged in front of the corrugated sheet, there will be formed a closed passage or flue of the full width of the casing similar to that formed by the wall at the back and the radiant heat will be largely cut off. Such a separate panel may be provided in front of the radiators in Figs. 1, 5 and 8. Such a front panel covering the radiator proper can be made adjustable to cut off more or less of the radiant effect as desired, and Figs. 10 to 13 illustrate such an adjustable covering panel.

The radiator is supported a short distance above the floor from hangers 11. A plate 27 constitutes in effect a fixed extension of the front plates 12 of the radiator up to the top of the casing, similar to the plate 23 in Fig. 5. The end portions of this plate are extended downward to the floor to form legs 28. The flanges 26 (Fig. 12) on these legs are fastened to the flanges 16 of the end frames by screws 29, or it may be by riveting or welding or other fastening means. The lower edge of the central portion of the plate 27 comes just above the top of the front plate 12 of the radiator as shown in Fig. 10.

A supplementary adjustable covering panel 30 is arranged to slide vertically to any desired distance below the lower edge of the plate 27 so as to expose a greater or less portion (the limits being all or none) of the compressed corrugated sheet 12 with the corresponding adjustment of the radiant effect from this sheet.

As shown in Fig. 13, the panel 30 has flanged edges 31 guided within the flanges 26 of the fixed plate 27. The plate 27 carries a screw 32 which passes through a vertical slot 33 in the adjustable plate 30 and is held on its inner end by a nut 34. A slotted head screw is illustrated, but a thumb screw may be used if it is intended to make the adjustment frequently. The construction is the same at opposite edges of the plates. By loosening the screws 32 the adjustable plate 30 may be raised or lowered to expose a greater or smaller part of the radiant face plate 12 of the radiator.

The same adjustable covering plate may be used for the radiators of the other figures described. And various other means may be used for securing an adjustment of the portion of the radiant front which is covered.

The front corrugated sheet may be shaped as shown with flat faces approximately meeting on their adjacent edges or with faces otherwise shaped in cross-section as shown in the aforesaid pending applications in order to secure either a more ornamental appearance at their front or a better flue effect (without the need of a supplementary cover plate in front) or both.

It will be observed that the corrugated sheets at opposite sides have the same length of engagement with the heating element, their differences in shape appearing only on their exposed or outer faces. The intimate connection of substantial area between the extended area structures and the pipe or other heating element is important in order to take the heat away from the latter rapidly and transmit it to the passing columns of air.

This combination of good contact with the heating element and the differences in structure toward the outer faces of the radiator is secured by the shaping of the corrugations described. The term "inside flues" is used to define the spaces between one of the plates 9 and the pair of transverse plates 8 connected thereto, or the space between one of the plates 6 and the two transverse plates 5 connected thereto; the outside flues being the spaces between two adjacent inside flues. Similarly the outward corrugation comprises a pair of plates 8 connected by the longitudinal plate 9, or a pair of the plates 5 connected by the longitudinal plate 6; similarly the inward corrugation includes the pair of transverse plates connected by the inside longitudinal plate 3. The inside plates 3 determine the area of contact with the heating element and the outside plates 6 and 9 respectively measure the outer faces of the structure.

The front face 6 and the outwardly projecting portions 7 which stiffen the latter may be replaced by various equivalent shapes which are shown in the previous pending applications referred to, and by various other equivalent shapes.

The invention in its broad aspect, is not limited to a steam pipe as the heating element. The heating element may be of various other shapes and the source of heat may be steam, electricity or other heating medium.

The radiator may also be used to cool the air of a room by circulating cold brine or the like through the pipe, inducing a downward draft and circulation of the air.

In Fig. 14 is shown an alternative structure. The steam pipe 1 is soldered to a single sheet of metal which passes through the transverse portions of the corrugations thereof. At the back deep corrugations 35 are provided. Those at the front are compressed from the original shape shown in dotted lines so as to provide wide faces 36 substantially or approximately contacting with each other along their edges and closing both the inside and the outside flues. The style of corrugations may also be varied in a great many ways, and other materials may be used for the extended area than the corrugated sheet metal shown.

The principal value of the invention is in the radiator mounted and framed as above described, but the radiator itself adapted for mounting in this way is a complete commercial article capable of use in various other arrangements.

The carrying of the corrugated plate or equivalent extended area structure at the front vertically beyond that of the back as shown in Figs. 1 to 4, is of value in increasing the area of heated metal with which the air contacts. Such extent of the corrugated sheet at one side may be either above or below that of the other side, or both. For example, the radiator of Fig. 4 might be inverted from the position shown in that figure. This would preserve the same area of heated metal in contact with the air. It would also preserve the same appearance as in Fig. 1, of a radiator extending from a point near the floor clear to the height of the window sill or other desired level.

What I claim is:

1. The combination with a wall of a room of a radiator backing thereon, said radiator having on its front corrugations with their outer faces closely adjacent to each other to form vertical flues and to substantially close the space between them and present the appearance of a substantially continuous front wall and having on its rear or wall side corrugations with intermediate open spaces between them.

2. The combination with a wall of a room of a radiator backing thereon, said radiator having on its front corrugations with their outer faces closely adjacent to each other to form vertical flues and to substantially close the space between them and present the appearance of a substantially continuous front wall and having on its rear or wall side corrugations with intermediate open spaces between them, the rear corrugations extending a greater distance laterally from the source of heat than the front corrugations.

3. The combination with a wall of a room of a radiator backing thereon, said radiator having on its front corrugations with their outer faces closely adjacent to each other to form vertical flues and to substantially close the space between them and present the appearance of a substantially continuous front wall and having on its rear or wall side corrugations with intermediate open spaces between them and end frames which with the wall close the cross-section of the air space at the back, said flues and said space at the back being open at top and bottom to induce a draft of the heated air.

4. The combination with a wall of a room of a radiator backing thereon, said radiator having on its front corrugations with their outer faces closely adjacent to each other to form vertical flues and to substantially close the space between them and present the appearance of a substantially continuous front wall and having on its rear or wall side corrugations with intermediate open spaces between them, in combination with an apertured top, said top being spaced above the rear corrugations and the outer faces of the front corrugations being extended up to said top.

5. The combination with a wall of a room of a radiator backing thereon, said radiator having on its front corrugations with their outer faces closely adjacent to each other to form vertical flues and to substantially close the space between them and present the appearance of a substantially continuous front wall and having on its rear or wall side corrugations with intermediate open spaces between them, in combination with an apertured top, said top being spaced above the rear corrugations and the outer faces of the front corrugations extending integrally up to said top.

6. The combination with a wall of a room of a radiator backing thereon, said radiator having on its front corrugations with their outer faces closely adjacent to each other to form vertical flues and to substantially close the space between them and present the appearance of a substantially continuous front wall and having on its rear or wall side corrugations with intermediate open spaces between them, said front corrugations being extended substantially above the rear corrugations.

7. A radiator having extended area structures at opposite sides each open at its top and bottom for the passage of air therethrough, that at one side extending vertically beyond that at the other.

8. A radiator having a heating element and extended area structures comprising corrugated sheets on opposite sides of said heating element each open at its top and bottom for the passage of air therethrough, that at one side extending vertically beyond that at the other.

9. A convection radiator having front and back portions forming vertical flues each open at its top and bottom for the passage of air therethrough for inducing a draft of the heated air, the front portion extending substantially beyond the back portion, in combination with an apertured top at the upper edge of said front portion.

10. A convection radiator having front and back portions forming vertical flues for inducing a draft of the heated air and each open at its top and bottom for the passage of air therethrough, the front portion extending substantially beyond the back portion, in combination with an apertured top at the upper edge of said front portion and end pieces extending also to said top.

11. A convection radiator having front and back portions forming vertical flues for inducing a draft of the heated air and each open at its top and bottom for the passage of air therethrough, the front portion extending substantially beyond the back portion, in combination with an apertured top at the upper edge of said front portion and end pieces extending from said top to a level below the bottoms of said front and back portions.

12. The combination with the wall of a room of a radiator supported therefrom below a window, an apertured top attached to the frame of the window, the body of the radiator being spaced below said top and the front of the radiator being extended up to said top.

13. The combination with the wall of a room of a radiator supported therefrom below a window, an apertured top attached to the frame of the window, the body of the radiator being spaced below said top and the front of the radiator extending integrally up to said top.

14. The combination with the wall of a room of a radiator supported therefrom below a window, an apertured top attached to the frame of the window, the body of the radiator being spaced below said top and the front of the radiator consisting of a corrugated sheet extending integrally up to said top.

15. The combination with a radiator of the convection type having a heat radiant front, of a casing about said radiator through which convection currents may pass and including a front plate adjustable bodily to different positions so as to expose a greater or less extent of said radiant front.

16. The combination with a radiator having a heat radiant front, of a casing enclosing said radiator open at the top and bottom to induce a draft of heated air through it, said casing including a front plate adjustable to different positions so as to expose a greater or less extent of said radiant front.

17. The combination with a radiator having a heat radiant front of a casing enclosing said radiator and open at top and bottom to induce a draft of heated air, said casing extending to a considerable distance above the radiator and having a fixed front plate above the radiator and a movable front plate adjustable to different positions so as to expose a greater or less extent of said radiant front.

18. A radiator having on its front, corrugations with their outer faces closely adjacent to each other to form vertical flues and substantially to close the space between them and to present the appearance of a substantially continuous front wall, and having on its rear, corrugations with intermediate open spaces between them.

19. A radiator having on its front, corrugations with their outer faces closely adjacent to each other to form vertical flues and substantially to close the space between them and presenting the appearance of a substantially continuous front wall and having on its rear, corrugations with intermediate open spaces between them, the rear corrugations extending a greater distance laterally from the source of heat than the front corrugations.

20. A radiator having on its front, corrugations with their outer faces closely adjacent to each other to form vertical flues and substantially to close the space between them and present the appearance of a substantially continuous front wall and having on its rear, corrugations with intermediate open spaces between them, and end frames between said front and rear corrugations, said flues being open at the top and bottom to induce a draft of heated air.

21. A radiator having on its front, corrugations with their outer faces closely adjacent to each other to form vertical flues and substantially to close the space between them and present the appearance of a substantially continuous front wall and having on its rear, corrugations with intermediate open spaces between them, said front corrugations being extended substantially above the rear corrugations.

22. The combination with a radiator of an enclosure therefor comprising vertical channel members each having its free edges embracing the opposite ends of the radiator, and a front member positioned between said channel members.

23. The combination with a radiator including a plurality of elements of an enclosure therefor comprising channel members each having its free edges embracing certain of the end elements of the radiator, and a front member positioned between said channel members.

24. The combination with a radiator including a plurality of elements of an enclosure therefor comprising channel members each having its free edges embracing certain of the end elements of the radiator, a front member positioned between said channel members, and a cover extending across said channel and front members.

25. The combination with a radiator having a plurality of elements of an enclosure therefor comprising channel members constituting flues each forming three wall portions and having its free edges embracing certain of the end elements of the radiator and forming therewith the remaining wall member of the flue, and a front member positioned between said channel members.

26. The combination with a radiator having a plurality of elements of an enclosure therefor comprising vertical channel members constituting flues each including an end and side wall members, each of said side wall members having its free edges embracing certain of the end elements of the radiator, and a front member positioned between said channel members.

27. The combination with a radiator having a plurality of elements of an enclosure therefor comprising vertical end members substantially co-extensive in height with the radiator; said end members being of substantially U-shape in cross section and each having its free vertical edges embracing certain of the end elements of the radiator, and a cover extending over the top of the radiator and said end members.

28. The combination with a radiator having a plurality of elements of an enclosure therefor comprising vertical end members substantially co-extensive in height with the radiator, said end members being of substantially U-shape in cross-section and each having its free vertical edges embracing certain of the end elements of the radiator, a front member positioned between said end members, and a cover extending over the top of the radiator and said end members.

29. The combination with a radiator having a plurality of elements of an enclosure therefor comprising vertical end members each including an end and side wall members, inwardly projecting flanges along the free edges of said side wall members extending intermediate and embracing certain of the end elements of the radiator, and a front member positioned between said end members.

30. The combination with a radiator having a plurality of elements of an enclosure therefor comprising vertical end members each including an end and side wall members, inwardly projecting flanges along the free edges of said side wall members extending intermediate and embracing certain of the end elements of the radiator, a front member positioned between said end members, and a cover extending over the top of said radiator and said end members.

31. The combination with a radiator having a plurality of elements of an enclosure therefor comprising vertical end members each including an end and side wall members, said side wall members having their free edges embracing certain of the end elements of the radiator, a front member secured at its opposite vertical edges to said vertical end members, and a cover extending over and confining the upper edges of said vertical end members and said front member.

In witness whereof, I have hereunto signed my name.

THOMAS E. MURRAY, Jr.